United States Patent
An et al.

(10) Patent No.: US 7,624,208 B2
(45) Date of Patent: Nov. 24, 2009

(54) METHOD, SYSTEM, AND COMPUTER PROGRAM FOR MANAGING A QUEUING SYSTEM

(75) Inventors: Yongli An, Markham (CA); Peter Kin Leung Shum, North York (CA)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/035,917

(22) Filed: Jan. 14, 2005

(65) Prior Publication Data
US 2006/0161920 A1    Jul. 20, 2006

(51) Int. Cl.
*G06F 3/00*    (2006.01)
(52) U.S. Cl. .................... 710/52; 710/16; 710/33
(58) Field of Classification Search ........... 710/16, 710/33, 52
See application file for complete search history.

(56) References Cited

U.S. PATENT DOCUMENTS

| | | | |
|---|---|---|---|
| 5,426,736 A | 6/1995 | Guineau, III | |
| 5,941,983 A | 8/1999 | Gupta et al. | |
| 6,044,418 A | 3/2000 | Muller | |
| 6,345,327 B1 | 2/2002 | Baskey et al. | |
| 6,421,723 B1 | 7/2002 | Tawil | |
| 6,647,443 B1 | 11/2003 | Schultz et al. | |
| 6,701,389 B2 | 3/2004 | Gorti et al. | |
| 7,363,369 B2 * | 4/2008 | Banerjee et al. | 709/224 |
| 2003/0177179 A1 * | 9/2003 | Jones et al. | 709/203 |
| 2005/0015763 A1 * | 1/2005 | Alexander et al. | 718/100 |

* cited by examiner

*Primary Examiner*—Tariq Hafiz
*Assistant Examiner*—Jasjit S Vidwan
(74) *Attorney, Agent, or Firm*—Konrad Raynes & Victor LLP; David W. Victor

(57) ABSTRACT

Disclosed is a queuing system implemented method, a queuing system and an article of manufacture. The queuing system implemented method directs the queuing system to manage a queue according to a quality of service parameter. The queue is associated with the queuing system. The queue is used for receiving requests. The queue is associated with a worker thread used to process contents of the queue. The queuing system implemented method includes: placing the request in the queue, permitting the worker thread to process the placed request, determining a response time, the response time being the time taken to complete processing of the placed request, and adjusting the worker thread if the determined response time does not satisfy the quality of service parameter, the adjusted worker thread used for processing another request placed in the queue in which a new response time taken to complete processing of the another placed request satisfying the quality of service parameter.

36 Claims, 5 Drawing Sheets

Performance Data

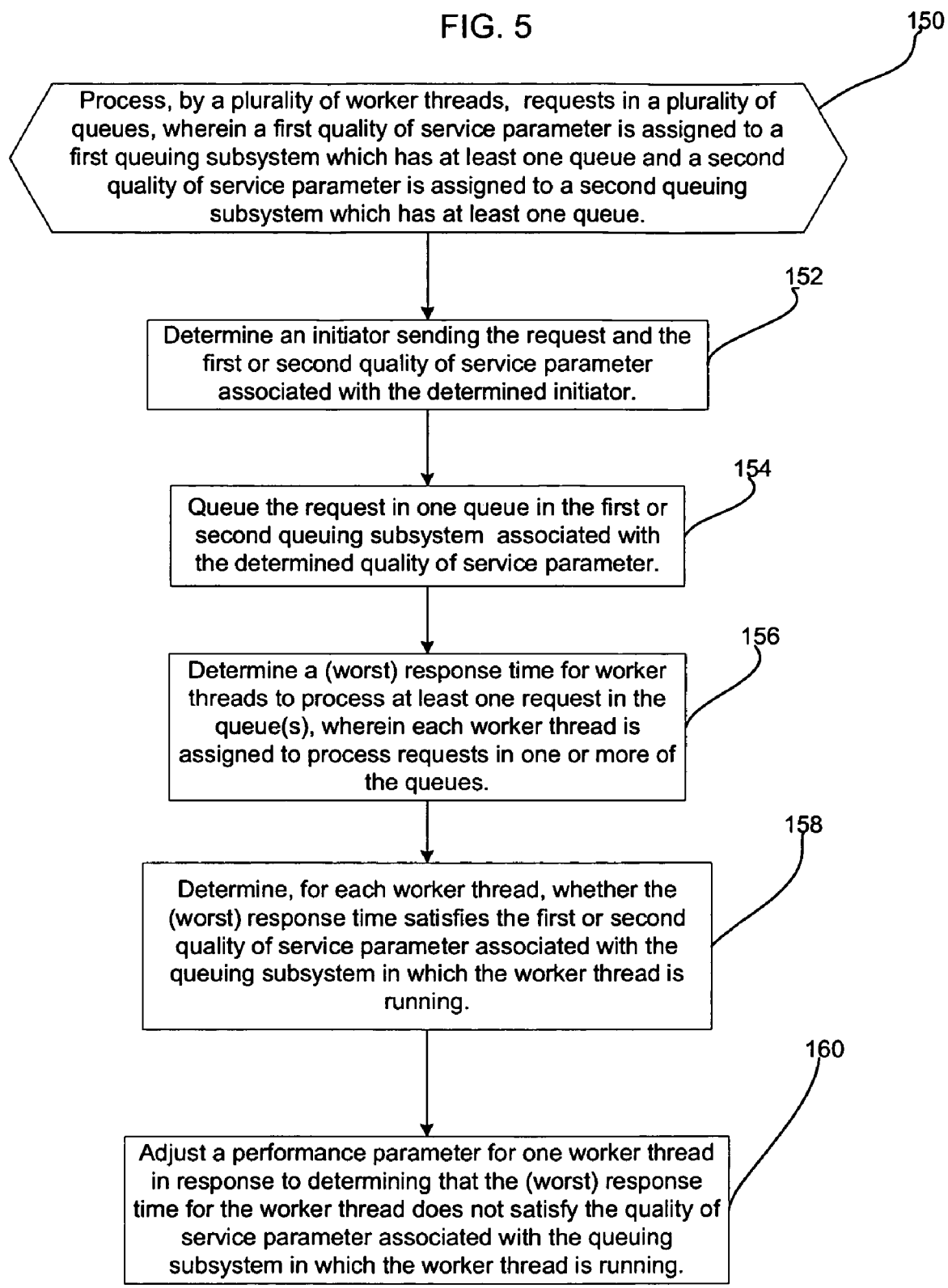

METHOD, SYSTEM, AND COMPUTER PROGRAM FOR MANAGING A QUEUING SYSTEM

FIELD

Provided is a queuing system, a queuing system implemented method for managing the queuing system, and an article of manufacture for managing the queuing system.

BACKGROUND

A server receiving transaction requests places the requests in a queue to process. A queue comprises a data structure used to sequence multiple demands for a resource, such as storage resources, computational resources, printing resources, etc. Requests in a queue may be processed in a first-in-first-out (FIFO) ordering. The server initiates one or more threads to process the requests in the queue and forward the requests to the requested application to execute. If the queue is empty, the thread may go into sleep mode and wake-up after an interval to process the queue again. The server may assign additional threads to process requests in the queue to improve the queue processing performance or use multiple queues to queue requests and concurrently process.

SUMMARY

In a first aspect of the embodiments, there is provided a queuing system implemented method of directing a queuing system to manage a queue according to a quality of service parameter, the queue associated with the queuing system, the queue used for receiving requests, the queue associated with a worker thread used to process contents of the queue, the queuing system implemented method including placing the request in the queue, permitting the worker thread to process the placed request, determining a response time, the response time being the time taken to complete processing of the placed request, and adjusting the worker thread if the determined response time does not satisfy the quality of service parameter, the adjusted worker thread used for processing another request placed in the queue in which a new response time taken to complete processing of the another placed request satisfying the quality of service parameter.

In a second aspect of the embodiments, there is provided a queuing system for managing a queue according to a quality of service parameter, the queue associated with the queuing system, the queue used for receiving requests, the queue associated with a worker thread used to process contents of the queue, the queuing system implemented method including: a placing module for placing the request in the queue, a permitting module for permitting the worker thread to process the placed request, a determining module for determining a response time, the response time being the time taken to complete processing of the placed request, and adjusting module for adjusting the worker thread if the determined response time does not satisfy the quality of service parameter, the adjusted worker thread used for processing another request placed in the queue in which a new response time taken to complete processing of the another placed request satisfying the quality of service parameter.

In a third aspect of the embodiments, there is provided an article of manufacture for directing a queuing system to manage a queue according to a quality of service parameter, the queue associated with the queuing system, the queue used for receiving requests, the queue associated with a worker thread used to process contents of the queue, the article of manufacture including: a program usable medium embodying one or more instructions executable by the queuing system, the one or more instructions including: queuing system executable instructions for placing the request in the queue, queuing system executable instructions for permitting the worker thread to process the placed request, queuing system executable instructions for determining a response time, the response time being the time taken to complete processing of the placed request, and queuing system executable instructions for adjusting the worker thread if the determined response time does not satisfy the quality of service parameter, the adjusted worker thread used for processing another request placed in the queue in which a new response time taken to complete processing of the another placed request satisfying the quality of service parameter.

BRIEF DESCRIPTION OF THE DRAWINGS

FIGS. 3, 4, and 5 illustrate operations of the queuing system of FIG. 1.

DETAILED DESCRIPTION

In the following description, reference is made to the accompanying drawings which form a part hereof and which illustrate several embodiments. It is understood that other embodiments may be utilized and structural and operational changes may be made without departing from the scope of the described embodiments.

The following detailed description of the embodiments does not limit the implementations of the embodiments to any particular queuing system programming language. The described embodiments may be implemented in any queuing system programming language provided that the OS (Operating System) provides the facilities that may support the requirements of the embodiments. A preferred embodiment is implemented in the C or C++ computer programming language (or other computer programming languages in conjunction with C/C++). Any limitations presented may be quite likely a result of a particular type of OS, queuing system programming language, or queuing system and may not be a limitation of the embodiments.

Figure 1:
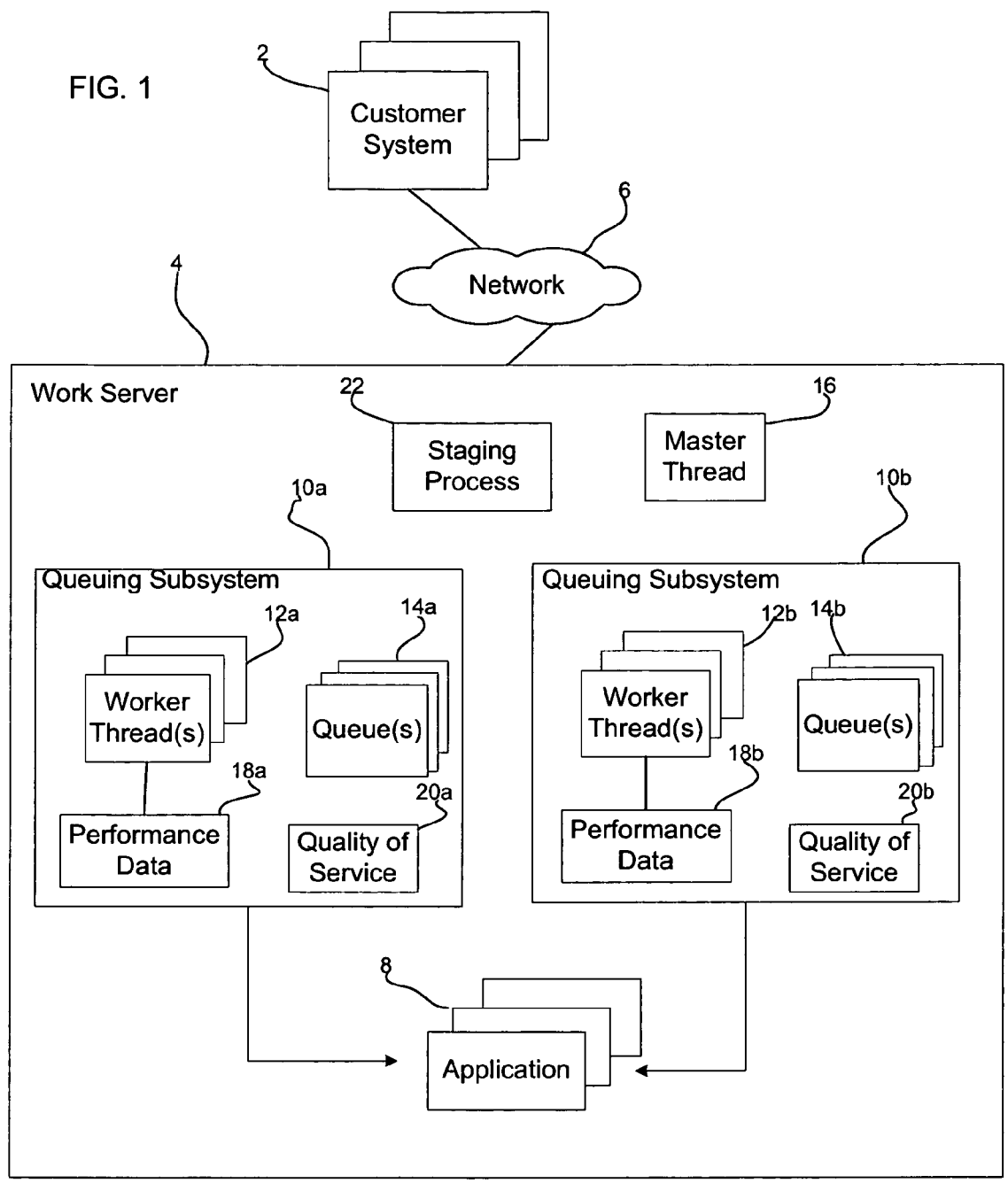
FIG. 1 illustrates a queuing system.

FIG. 1 illustrates a queuing system of an embodiment. Shown in FIG. 1 is a network computing environment having a plurality of customer systems 2 that communicate with a work server 4 over a network 6. The customer systems 2 submit transaction requests, such as asynchronous transaction requests, to the work server 4 to forward to one or more applications 8 to execute. The work server 4 includes one or more queuing subsystems 10a, 10b (two are shown) to queue requests, i.e., transactions, from the customer systems 2. Each queuing subsystem 10a, 10b comprises one or more worker threads 12a, 12b that process requests queued in one or more queues 14a, 14b. The terms queue(s) 14a, 14b each represents and references the one or more queues included in the queuing subsystems 10a, 10b to queue requests. Thread(s) 12a and 12b each refer to one or more threads that may be initiated in each queuing subsystem 10a, 10b. In one embodiment, one thread 12a, 12b is assigned to one of the queues 14a, 14b, such that there is one thread to process one queue in one of the queuing subsystems 10a, 10b. Master thread 16 may allocate worker thread(s) 12a, 12b to the queue(s) 14a, 14b, such that each worker thread only processes requests in one assigned queue. The worker thread(s) 12a, 12b each gather performance data 18a, 18b on their performance processing queued requests. The worker thread(s) 12a, 12b process requests in the queue(s) 14a, 14b and forward the requests to the application 8 associated with the queuing subsystem 10a, 10b from which the request is forwarded.

A quality of service parameter 20a, 20b is associated with each queuing subsystem 10a, 10b, where different quality of service parameter 20a, 20b values may be associated with different queuing subsystems 10a, 10b. A quality of service parameter 20a, 20b indicates a performance parameter goal that the queuing subsystem 10a, 10b is supposed to satisfy. For instance, the quality of service parameter 20a, 20b may specify the response time to process queued requests, which may comprise the time a request is pending in the queue plus the time to process the queued request. The quality of service parameter 20a, 20b may specify contractually agreed upon response time for queued requests. In such embodiments, a quality of service parameter is determined to be satisfied if the response time is less than the response time (or less than another performance parameter) specified by the quality of service parameter. For improved performance, the quality of service parameter may also specify an acceptable or predefined margin of error. Likewise a quality of service parameter is not satisfied if the response time (or some other performance parameter) is less than the quality of service parameter by some margin, or is greater than the quality of service parameter. In certain embodiments, the customer may enter into an agreement for a response time corresponding to a level such as gold, silver, bronze, etc. The service provider managing the work server 4 may contract with a customer operating one or more customer systems for a specific quality of service, such as a response time. The service provider will make the best effort to have the customer's transaction requests processed (if not all, the majority of them) at least at the level specified by the agreed upon quality of service parameter 20a, 20b.

In certain embodiments, each queuing subsystem 10a, 10b may be associated with a different quality of service parameter 20a, 20b, such that different customers contracting at the same quality of service level would have their requests directed to the same queuing subsystem 10a, 10b associated with that agreed upon quality of service level. Alternatively, different applications 8 may be associated with different queuing subsystem 10a, 10b, which are in turn associated with different quality of service parameters 20a, 20b. This ensures the application will have its requests processed at a particular quality of service level. Thus, more mission critical applications 8 may be forwarded requests from a queuing subsystem 10a, 10b associated with a higher quality of service and, likewise, less critical applications 8 may be forwarded requests from a queuing subsystem 10a, 10b associated with a lower quality of service.

A staging process 22 processes the requests received from the customer systems 2 and forwards them to one queue(s) 14a, 14b in an appropriate queuing subsystem 10a, 10b. The staging process 22 may select the queuing subsystem 10a, 10b for a request based on a quality of service or other performance attribute associated with the request, such as the customer or application source of the request. The staging process 22 then directs the request to a queuing subsystem 10a, 10b associated with the determined quality of service level. The staging process 22 may further select one of the queue(s) 14a, 14b within a determined queuing subsystem 10a, 10b using a selection technique, such as round robin, queue load balancing, etc.

The customer systems 2 may comprise any computing device capable of submitting requests or transactions over the network 6 to the work server 4, including desktop computers, notebook computers, workstations, hand held computers, servers, mainframes, telephony devices, etc. The work server 4 may comprise one or more computational machines, such as one or more servers, suitable for handling transaction requests from the customer systems 2. In certain embodiments, the work server 4 may execute the applications 8 to which the requests are directed or forward the requests to a different machine executing the applications 8. The network 6 may comprise one or more networks known in the art, such as a Wide Area Network (WAN), Local Area Network (LAN), Storage Area Network (SAN), wireless network, the Internet, and Intranet, etc. The applications 8 may comprise applications known in the art that receive requests from distributed clients, such as a database server, financial system, web site application (e.g., Internet gaming, financial site, etc.). The staging process 22 may comprise a stand alone application program, or a Common Gateway Interface (CGI) program running in a Web server or a servlet process. The queues 14a, 14b may queue data in manners known in the art, such as First-In-First-Out (FIFO), etc.

Figure 2:
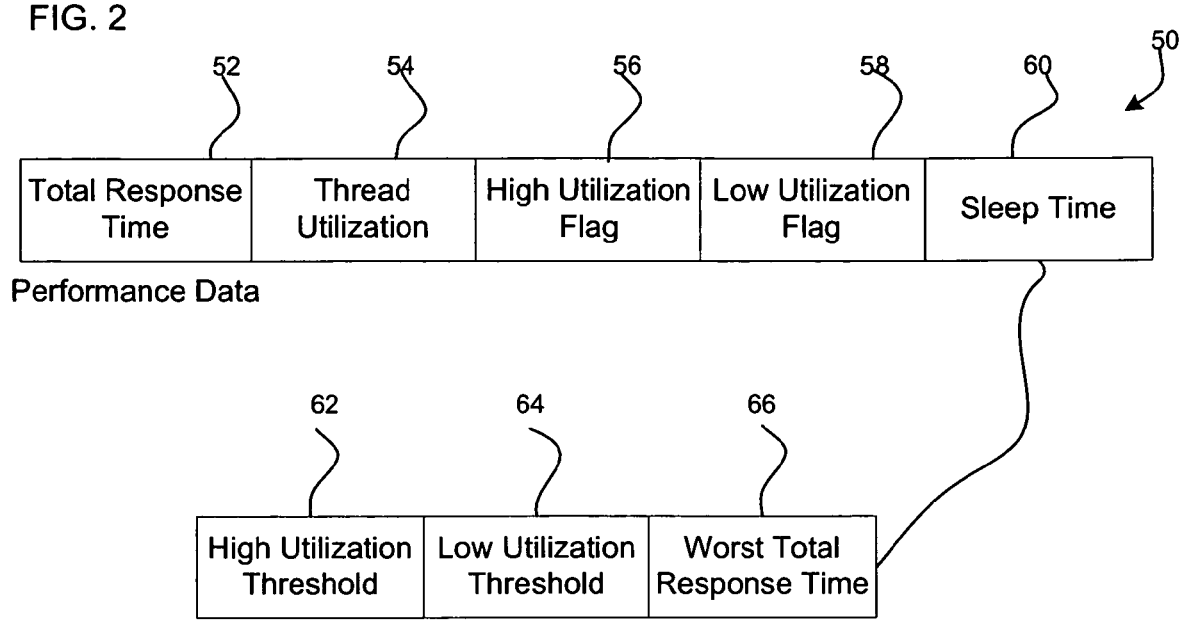
FIG. 2 illustrates performance data used by the queuing system of FIG. 1.

FIG. 2 illustrates an embodiment of performance data 50 used by the queuing system of FIG. 1. The performance data 50 is used by the worker threads 12a, 12b maintain for the performance data 18a, 18b. A total response time 52 for the worker thread 12a, 12b indicates the response time as calculated by the worker thread 12a, 12b. A thread utilization 54 indicates the utilization of the worker thread, which may be calculated by determining the time spent processing queued requests divided by the time spent processing queued requests plus the time spent in sleep mode. A high utilization flag 56 is set by the worker thread 12a, 12b if the calculated thread utilization 54 exceeds a high utilization threshold 62. A low utilization flag 58 is set by the worker thread 12a, 12b if the calculated thread utilization 54 falls below a low utilization threshold 64. The sleep time 60 indicates an interval the worker thread(s) 14a, 14b waits before processing the queue(s) 14a, 14b after processing a predefined number of requests or determining the queue 14a, 14b is empty. The master thread 16 may access the performance information 50 to determine whether to add or disable one worker thread 12a, 12b and its associated queue 14a, 14b in the queuing subsystem 10a, 10b.

FIGS. 3, 4, 5 and 6 illustrate operations of the queuing system of FIG. 1. The operations may be used by the worker thread(s) 12a, 12b execute to process requests in the queue(s) 14a, 14b to which the worker thread is assigned. Upon initiating worker thread 12a, 12b operations (at block 100), one of the worker thread(s) 12a, 12b processes (at block 102) requests in one assigned queue 14a, 14b. The worker thread 12a, 12b indicates (at block 104) in field 54 a total response time to process at least one request in the queue. The total response time may be calculated by the sum of the time the request was pending in the queue plus a transactional response time to process the request. A worst total response time is calculated every time a request is processed. Once a predefined number of requests are processed, or the queue to which the worker thread 12a, 12b is assigned becomes empty, the worst total response time 66 for this processing cycle is available and the worker thread 12a, 12b sleeps for the indicated sleep time 60 for the worker thread after the sleep time 60 is adjusted by the worker thread 12a, 12b (at block 106) if the worst total response time 66 does not satisfy a quality of service parameter 20a, 20b associated with the queuing subsystem 10a, 10b. The performance parameter may be adjusted by performing the operations at blocks 110 and 112. At block 110, the worker thread(s) 12a, 12b reduces the performance parameter (e.g., increase the sleep time 60) to reduce worker thread performance in response to determining that the response time is less than the quality of service parameter 20a, 20b associated with the queuing subsystem 10a, 10b by an acceptable margin (i.e., the response time is better than expected). The worker thread(s) 12a, 12b may increase (at block 112) the performance parameter (e.g., reduce the sleep time, or set the sleep time to 0) to increase the worker thread performance in response to determining that the response time is greater than the quality of service parameter 20a, 20b (i.e., the response time is longer than expected). Reducing the sleep time reduces the time requests are pending in the queue(s) 14a, 14b by increasing the frequency at which the worker thread(s) 12a, 12b process the queue 14a, 14b. When adjusting the sleep time, the worker thread(s) 12a, 12b may increase or decrease the sleep time by an increment amount, such as 500 milliseconds. When decreasing the sleep time, the worker thread(s) 12a, 12b may set the sleep time to 0 to increase its performance more dramatically if needed. Further, the worker thread may take into account a maximum sleep time, e.g., 30,000 ms, such that the sleep time will not be increased beyond this amount. These values may be set based on empirical testing or user preferences. Further, in the described embodiment, the worker thread determined whether to self-adjust its own sleep time 60. In an alternative embodiment, the master thread 16 may check the worst total response time 66 and determine whether and by how much to adjust the sleep time 60 for a worker thread.

Figure 4:
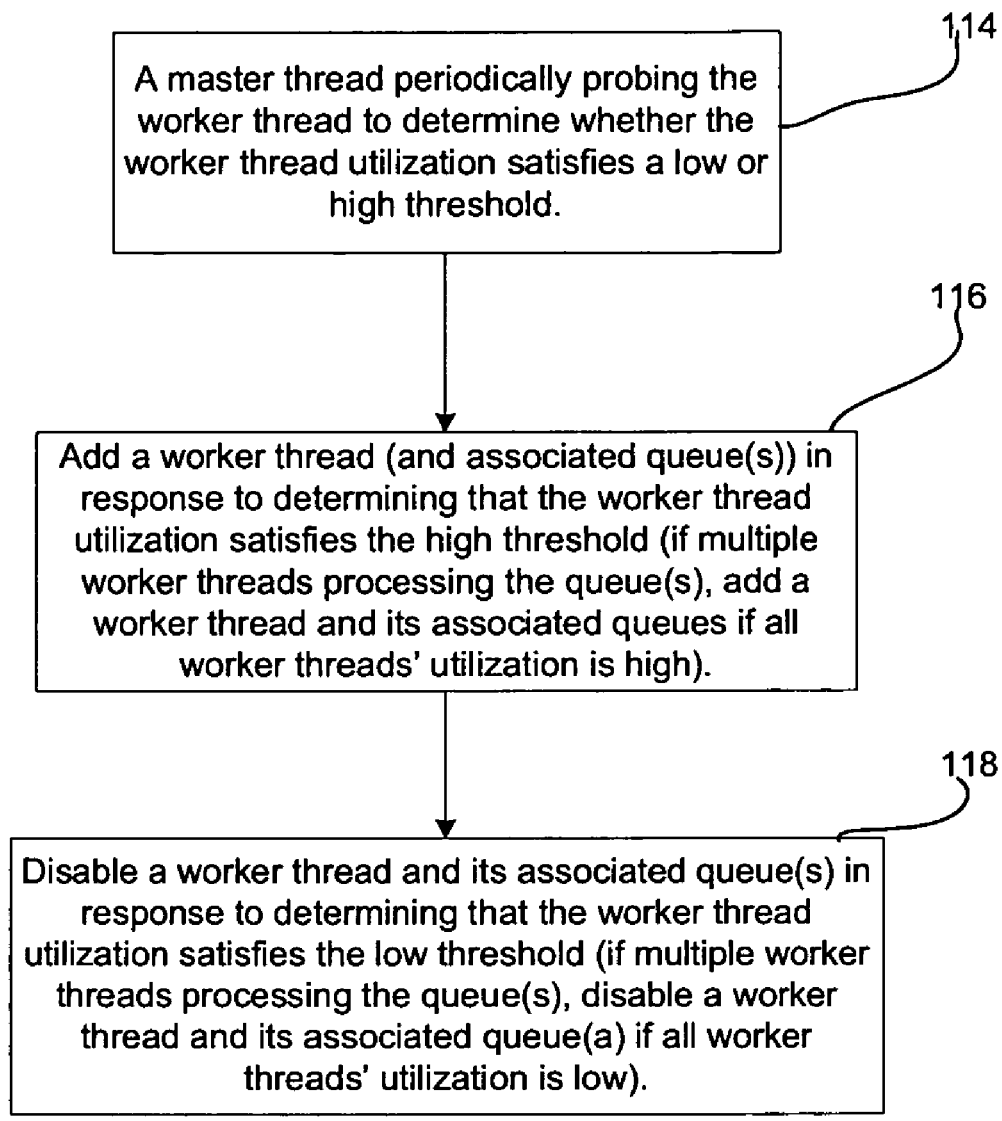

With respect to FIG. 4, at block 114, a master thread 16 periodically probes the worker threads 12a, 12b to determine whether the worker thread utilization 54 satisfies a high 62 or low 64 utilization thresholds. The master thread 16 adds (at block 116) a worker thread and its associated queue(s) 14a, 14b to process requests in response to determining that the worker thread utilization satisfies the high utilization threshold 62. If multiple worker threads are processing requests in the queues 14a, 14b, then a worker thread and its associated queue(s) 14a, 14b may be added only if the one or all worker threads in one queuing subsystem 10a, 10b reach a high utilization threshold 62. The threshold may be reached if all threads in one queuing subsystem reach the high utilization threshold 62. The master thread 16 may disable (at block 118) one worker thread(s) 12a, 12b and its associated queue(s) 14a, 14b assigned to one queue(s) 14a, 14b in response to determining that the worker thread utilization 54 satisfies the low utilization threshold 64. If multiple worker threads 12a, 12b are processing requests in one queuing subsystem 10a, 10b, then the master thread 16 may disable a worker thread and its associated queue(s) 14a, 14b if all worker threads in one queuing subsystem 10a, 10b reach a low utilization threshold 64.

In managing the number of worker threads in one queuing subsystem 10a, 10b, the master thread 16 may take into account a minimum number of threads that are created in one queuing subsystem 10a, 10b and would be assigned to a queue 14a, 14b upon initializing a queue to use. Further, the master thread 16 when disabling a worker thread 12a, 12b and its associated queue 14a, 14b may not reduce the total number of worker threads for a queue below a minimum threshold of worker threads per queuing subsystem 10a, 10b. Further, the master thread 16 may take into account a maximum threshold of worker threads that may be assigned to one queuing subsystem 10a, 10b.

In managing the number of queues 14a, 14b associated with each worker thread 12a, 12b, one worker thread is associated one queue only, in which case the one queue receiving the requests from the staging process 22. In another possible embodiment, this one queue 14a, 14b can consist of 2 sub-queues, which are alternatively playing the role of feeding queue and receiving queue. A feeding queue is the queue from which the associated worker thread processes requests, and which does not accept any incoming requests from the staging process. A receiving queue is the queue that is receiving incoming requests from the staging process but not being processed by its associated worker thread. Once the feeding queue becomes empty, the role of these 2 sub-queues swaps therefore the feeding queue becoming the receiving queue and the receiving queue becomes the feeding queue.

Figure 3:
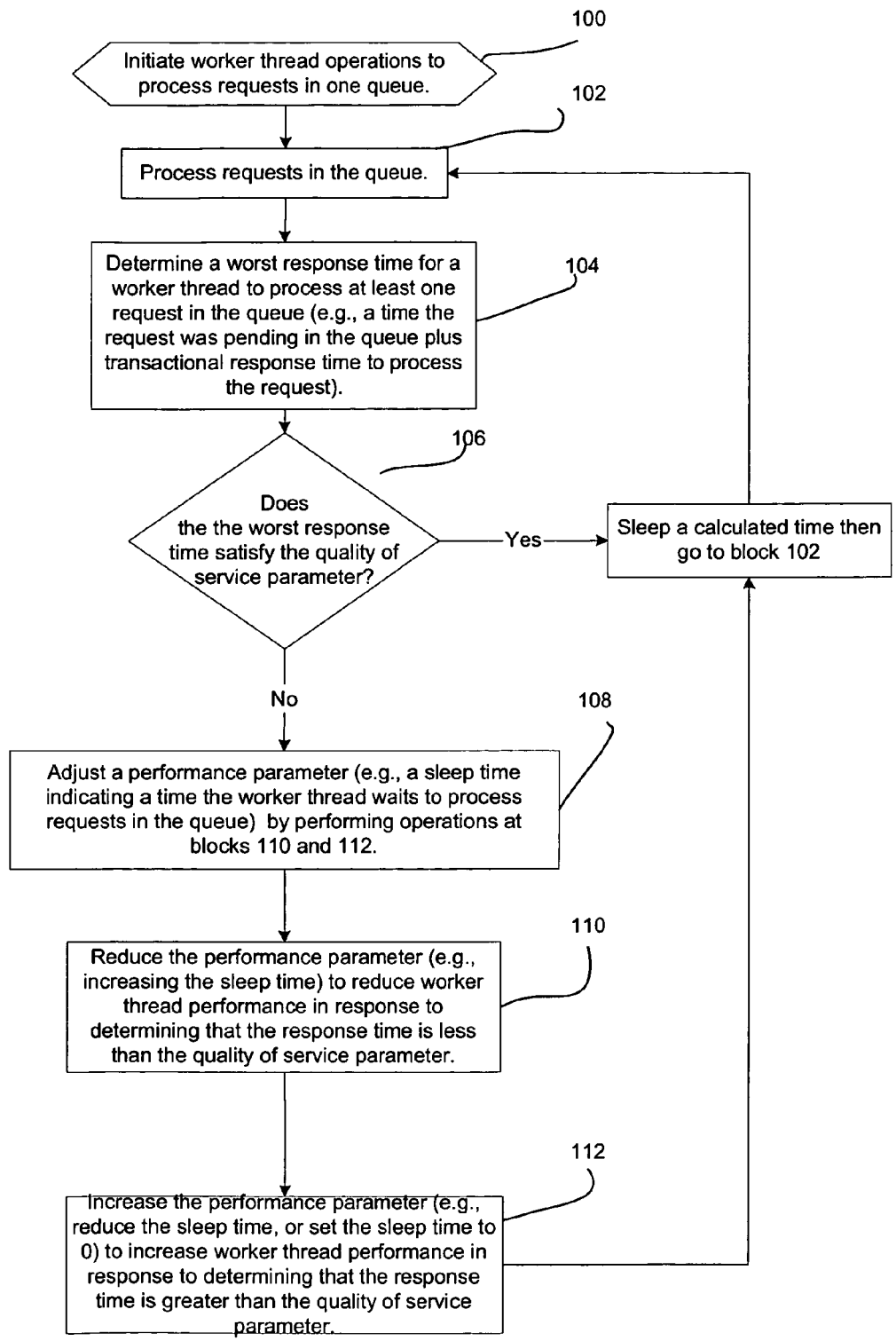

With the described embodiment of FIGS. 3 and 4, to ensure that the queuing systems 10a, 10b are satisfying an agreed upon quality of service parameter 20a, 20b, the worker thread sleep time 60 may be reduced to increase performance if the agreed upon quality of service is not being met or additional worker threads and their associated queues may be added to improve the request processing response time. These operations may be performed with respect to each queuing subsystem 10a, 10b.

FIG. 5 illustrates operations performed when there are a plurality of queuing subsystems 10a, 10b, each associated with a different quality of service parameter 20a, 20b to provide different levels of processing for different customers and/or applications based on agreed upon quality of service levels. At block 150, a plurality of worker threads 12a, 12b process requests in a plurality of queues 14a, 14b, wherein one or more threads may be assigned to each queue. A first quality of service parameter 20a is assigned to a first queuing subsystem 10a, wherein there is at least one queue 14a, and a second quality of service parameter 20b assigned to the second queuing subsystem 10b, wherein there is at least one queue 14b. The staging process 22, in response to receiving a request from one customer system 2, determines (at block 152) an initiator (e.g., application or customer) sending the request and the first or second quality of service parameter associated with the determined initiator. The staging process 22 queues (at block 154) the request in one queue in the first queuing subsystem 10a or a second queuing subsystem 10b associated with the determined quality of service parameter 20a, 20b for the request. The worker threads 12a, 12b, or some other process, determines (at block 156) a response time 52 for worker threads to process at least one request in their associated queue(s) 14a, 14b, wherein each worker thread 12a, 12b is assigned to process requests in one queue(s) 14a, 14b.

Each worker thread determines (at block 158) whether the response time 52 satisfies the first 20a or second 20b quality of service parameter associated with the queuing subsystem 10a, 10b in which the worker thread 12a, 12b is running. The performance parameter for one worker thread(s) 12a, 12b is adjusted (at block 160) in response to determining that the response time 52 for the worker thread does not satisfy the quality of service parameter 20a, 20b associated with the queuing subsystem 10a, 10b in which the worker thread is running. No further action may be performed if the quality or service parameter is satisfied. In addition, the master thread 16 may perform the operations described with respect to blocks 114-118 in FIG. 4 to add or remove worker threads and their associated queues from the queuing subsystems 10a, 10b to maintain the quality of service agreed upon.

The queuing subsystems 10a, 10b associated with different quality of service parameters 20a, 20b would then forward queued requests to an application 8 associated with that queuing subsystem 10a, 10b. In certain embodiments, if the quality of service parameter 20a, 20b is associated with a customer, then the customer request may be forwarded to the queuing subsystem 10a, 10b associated with the quality of service associated with the customer submitting the request. In such case, different customers associated with the same quality of service parameter 20a, 20b may have their requests queued in the same queuing subsystem 10a, 10b so that their requests are submitted to the same one or more applications 8 associated with the queuing subsystem 10a, 10b. Moreover, in certain configurations, the different queuing subsystems 10a, 10b may forward their requests to a same application 8, so that customers associated with different quality of service parameters 20a, 20b share the same application, but have their requests processed at different rates in different queuing subsystems 10a, 10b associated with the customer initiating the request.

In further embodiments, if the quality of service parameter 20a, 20b is associated with an application 8, then the customer request may be forwarded to the queuing subsystem 10a, 10b associated with the quality of service associated with the application that originated the request. In such case, different customers using the same application, which is associated with the quality of service, may have their requests queued in the same queuing subsystem 10a, 10b so that their requests are submitted to the application at the same quality of service level.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the quality of service parameter comprised the response time to process a request and the adjusted performance parameter comprised the sleep time. In alternative embodiments, the quality of service parameter may concern a different performance metric and the adjusted performance parameter may comprise a performance parameter other than the sleep time which when adjusted increases or decreases the rate at which a worker thread processes queued requests.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention.

What is claimed is:

1. A queuing system implemented method of directing a queuing system to manage a queue according to a quality of service parameter, the queue associated with the queuing system, the queue used for receiving requests, the queue associated with a worker thread used to process contents of the queue, the queuing system implemented method comprising:

placing a first request in the queue;

permitting the worker thread to process the placed first request;

determining a response time, the response time being the time taken to complete processing of the placed first request;

adjusting the worker thread if the determined response time does not satisfy the quality of service parameter;

processing, by the adjusted worker thread, a second request placed in the queue; and determining whether a new response time taken to complete processing of the second request satisfies the quality of service parameter.

2. The queuing system implemented method of claim 1, wherein the determined response time comprises:

a delay time, the delay time being the time taken in which the placed first or second request remained pending in the queue; and a transactional time, the transactional time being the time taken to process the placed first or second request.

3. The queuing system implemented method of claim 1, further comprising:

processing a set of requests placed in the queue;

determining a worst response time, the determined worst response time being the longest response time among the response times associated with processing a set of requests placed in the queue; and adjusting the worker thread if the determined worst response time does not satisfy the quality of service parameter, the adjusted worker thread processing another set of requests placed in the queue, and a new worst response time taken to complete processing of the another set of placed requests satisfying the quality of service parameter.

4. The queuing system implemented method of claim 3, wherein the determined worst response time does not satisfy the quality of service parameter because the determined worst response time is at least one of:
   less than the quality of service parameter by a predefined margin, and
   greater than the quality of service.

5. The queuing system implemented method of claim 3, wherein the adjusting of the worker thread if the determined worst response time does not satisfy the quality of service parameter comprises:
   reducing the performance of the worker thread if the determined worst response time is less than the quality of service parameter by a predefined margin; and
   increasing the performance of the worker thread if the determined worst response time is greater than the quality of service parameter.

6. The queuing system implemented method of claim 1, wherein the adjusting of the worker thread comprises:
   adjusting a performance parameter associated with the worker thread, the performance parameter comprising a sleep time indicating a time the worker thread waits to process the placed first or second request.

7. The queuing system implemented method of claim 6, wherein the adjusting of the performance parameter comprises:
   reducing the performance parameter by increasing the sleep time; and
   increasing the performance parameter by decreasing the sleep time.

8. The queuing system implemented method of claim 1, further comprising:
   determining a worker thread utilization for the worker thread; and
   ascertaining whether the determined worker thread utilization satisfies a threshold.

9. The queuing system implemented method of claim 8, wherein the threshold comprises:
   a low threshold; and
   a high threshold.

10. The queuing system implemented method of claim 9, further comprising:
    permitting a master control thread to probe the worker thread to determine whether the determined worker thread utilization satisfies any one of a high threshold and a low threshold.

11. The queuing system implemented method of claim 10, further comprising:
    permitting the master control thread to perform at least one of adding and disabling the worker thread and the associated queue in response to determining that determined worker thread utilizations satisfy at least one of the high threshold and the low threshold.

12. The queuing system implemented method of claim 9, further comprising:
    adding a new worker thread and an associated queue if all of the worker threads' utilization exceeds the high threshold; and
    disabling a worker thread and its associated queue if all of the worker threads' utilization is less than the low threshold.

13. The method of claim 1, wherein there are a plurality of queuing subsystems, each including a queue, worker threads assigned to process requests in the queue, and a quality of service parameter, wherein the operations of determining the response time and determining the worker thread are performed with respect to each queuing subsystem and the quality of service parameter for the queuing subsystem.

14. The method of claim 1, wherein the queuing subsystems provide different levels of processing for different request submitters based on agreed quality of service levels, further comprising:
    receiving a request from a request submitter;
    determining the quality of service parameter of the request submitter submitting the request;
    determining the queuing subsystem associated with the determined quality of service parameter;
    queuing the request in the queue of the determined queuing subsystem.

15. A queuing system for managing a queue according to a quality of service parameter, the queue associated with the queuing system, the queue used for receiving requests, the queue associated with a worker thread used to process contents of the queue, the queuing system comprising:
    a queue;
    circuitry to perform operations, the operations comprising:
       placing a first request in the queue;
       permitting the worker thread to process the placed first request;
       determining a response time, the response time being the time taken to complete processing of the placed first request;
       adjusting the worker thread if the determined response time does not satisfy the quality of service parameter;
       processing, by the adjusted worker thread, a second request placed in the queue; and
       determining whether a new response time taken to complete processing of the second request satisfies the quality of service parameter.

16. The queuing system of claim 15, wherein the determined response time comprises:
    a delay time, the delay time being the time taken in which the placed first or second request remained pending in the queue; and
    a transactional time, the transactional time being the time taken to process the placed first or second request.

17. The queuing system of claim 15, wherein the operations further comprise:
    processing a set of requests placed in the queue;
    determining a worst response time, the determined worst response time being the longest response time among the response times associated with processing a set of requests placed in the queue; and
    adjusting the worker thread if the determined worst response time does not satisfy the quality of service parameter, the adjusted worker thread processing another set of requests placed in the queue, and a new worst response time taken to complete processing of the another set of placed requests satisfying the quality of service parameter.

18. The queuing system of claim 17, wherein the adjusting of the worker thread if the determined worst response time does not satisfy the quality of service parameter comprises:

reducing the performance of the worker thread if the determined worst response time is less than the quality of service parameter by a predefined margin; and increasing the performance of the worker thread if the determined worst response time is greater than the quality of service parameter.

19. The queuing system of claim 15, wherein the adjusting of the worker thread comprises:

adjusting a performance parameter associated with the worker thread, the performance parameter comprising a sleep time indicating a time the worker thread waits to process the placed first or second request.

20. The queuing system of claim 15, wherein the operations further comprise:

determining a worker thread utilization for the worker thread; and ascertaining whether the determined worker thread utilization satisfies a threshold.

21. The queuing system of claim 20, wherein the threshold comprises:

a low threshold; and a high threshold.

22. The queuing system of claim 21, wherein the operations further comprise:

permitting a master control thread to probe the worker thread to determine whether the determined worker thread utilization satisfies any one of a high threshold and a low threshold.

23. The queuing system implemented method of claim 21, wherein the operations further comprise:

adding a new worker thread and an associated queue if all of the worker threads' utilization exceeds the high threshold; and disabling a worker thread and its associated queue if all of the worker threads' utilization is less than the low threshold.

24. The queuing system of claim 15, wherein there are a plurality of queuing subsystems, each including a queue, worker threads assigned to process requests in the queue, and a quality of service parameter, wherein the operations of determining the response time and determining the worker thread are performed with respect to each queuing subsystem and the quality of service parameter for the queuing subsystem.

25. The queuing system of claim 15, wherein the queuing subsystems provide different levels of processing for different request submitters based on agreed quality of service levels, wherein the operations further comprise:

receiving a request from a request submitter;

determining the quality of service parameter of the request submitter submitting the request;

determining the queuing subsystem associated with the determined quality of service parameter;

queuing the request in the queue of the determined queuing subsystem.

26. An article of manufacture comprising a computer readable storage medium having code executed for directing a queuing system to manage a queue according to a quality of service parameter, the queue associated with the queuing system, the queue used for receiving requests, the queue associated with a worker thread used to process contents of the queue, wherein the code is executed to perform operations, the operations comprising:

placing a first request in the queue;

permitting the worker thread to process the placed first request;

determining a response time, the response time being the time taken to complete processing of the placed first request;

adjusting the worker thread if the determined response time does not satisfy the quality of service parameter;

processing, by the adjusted worker thread, a second request placed in the queue; and determining whether a new response time taken to complete processing of the second request satisfies the quality of service parameter.

27. The article of manufacture of claim 26, wherein the determined response time comprises:

a delay time, the delay time being the time taken in which the placed first or second request remained pending in the queue; and a transactional time, the transactional time being the time taken to process the placed first or second request.

28. The article of manufacture of claim 26, wherein the operations further comprise:

processing a set of requests placed in the queue;

determining a worst response time, the determined worst response time being the longest response time among the response times associated with processing a set of requests placed in the queue; and adjusting the worker thread if the determined worst response time does not satisfy the quality of service parameter, the adjusted worker thread processing another set of requests placed in the queue, and a new worst response time taken to complete processing of the another set of placed requests satisfying the quality of service parameter.

29. The article of manufacture of claim 28, wherein the adjusting of the worker thread if the determined worst response time does not satisfy the quality of service parameter comprises:

reducing the performance of the worker thread if the determined worst response time is less than the quality of service parameter by a predefined margin; and increasing the performance of the worker thread if the determined worst response time is greater than the quality of service parameter.

30. The article of manufacture of claim 26, wherein the adjusting of the worker thread comprises:

adjusting a performance parameter associated with the worker thread, the performance parameter comprising a sleep time indicating a time the worker thread waits to process the placed first or second request.

31. The article of manufacture of claim 26, wherein the operations further comprise:

determining a worker thread utilization for the worker thread; and ascertaining whether the determined worker thread utilization satisfies a threshold.

32. The queuing system of claim 31, wherein the threshold comprises:

a low threshold; and a high threshold.

33. The article of manufacture of claim 32, wherein the operations further comprise:

permitting a master control thread to probe the worker thread to determine whether the determined worker thread utilization satisfies any one of a high threshold and a low threshold.

34. The article of manufacture of claim 32, wherein the operations further comprising:

adding a new worker thread and an associated queue if all of the worker threads' utilization exceeds the high threshold; and disabling a worker thread and its associated queue if all of the worker threads' utilization is less than the low threshold.

35. The article of manufacture of claim 26, wherein there are a plurality of queuing subsystems, each including a queue, worker threads assigned to process requests in the queue, and a quality of service parameter, wherein the operations of determining the response time and determining the worker thread are performed with respect to each queuing subsystem and the quality of service parameter for the queuing subsystem.

36. The article of manufacture of claim 26, wherein the queuing subsystems provide different levels of processing for different request submitters based on agreed quality of service levels, wherein the operations further comprise:

receiving a request from a request submitter;

determining the quality of service parameter of the request submitter submitting the request;

determining the queuing subsystem associated with the determined quality of service parameter;

queuing the request in the queue of the determined queuing subsystem.

* * * * *

UNITED STATES PATENT AND TRADEMARK OFFICE
CERTIFICATE OF CORRECTION

PATENT NO. : 7,624,208 B2  Page 1 of 1
APPLICATION NO. : 11/035917
DATED : November 24, 2009
INVENTOR(S) : An et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1344 days.

Signed and Sealed this

Twenty-sixth Day of October, 2010

David J. Kappos
*Director of the United States Patent and Trademark Office*